United States Patent
Yoshitake

(10) Patent No.: US 11,591,440 B2
(45) Date of Patent: Feb. 28, 2023

(54) METHOD FOR PRODUCING ORGANOPOLYSILOXANE CURED PRODUCT, ORGANOPOLYSILOXANE CURED PRODUCT, LAYERED PRODUCT, AND OPTICAL PART

(71) Applicant: DOW TORAY CO., LTD., Tokyo (JP)

(72) Inventor: Makoto Yoshitake, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 286 days.

(21) Appl. No.: 16/760,538

(22) PCT Filed: Oct. 30, 2018

(86) PCT No.: PCT/JP2018/040248
§ 371 (c)(1),
(2) Date: Apr. 30, 2020

(87) PCT Pub. No.: WO2019/088067
PCT Pub. Date: May 9, 2019

(65) Prior Publication Data
US 2021/0179783 A1    Jun. 17, 2021

(30) Foreign Application Priority Data

Oct. 31, 2017  (JP) .............................. JP2017-211400

(51) Int. Cl.
| C08G 77/20 | (2006.01) |
| C08G 77/08 | (2006.01) |
| B32B 27/28 | (2006.01) |
| C08G 77/14 | (2006.01) |
| C08J 3/24 | (2006.01) |
| C08J 3/28 | (2006.01) |

(52) U.S. Cl.
CPC ............. *C08G 77/08* (2013.01); *B32B 27/283* (2013.01); *C08G 77/14* (2013.01); *C08G 77/20* (2013.01); *C08J 3/24* (2013.01); *C08J 3/28* (2013.01); *B32B 2310/08* (2013.01); *B32B 2551/00* (2013.01)

(58) Field of Classification Search
CPC ......... C08G 77/12; C08G 77/20; C08L 83/04; B01J 23/04; B01J 23/42; B01J 23/44; B01J 23/46; B32B 2310/08
See application file for complete search history.

(56) References Cited

U.S. PATENT DOCUMENTS

| 3,852,832 | A | * | 12/1974 | McGhan | ................... | A61F 2/12 623/8 |
| 4,510,094 | A | | 4/1985 | Drahnak | | |
| 4,587,137 | A | | 5/1986 | Eckberg | | |
| 4,603,168 | A | | 7/1986 | Sasaki et al. | | |
| 2006/0105480 | A1 | | 5/2006 | Boardman et al. | | |
| 2009/0123764 | A1 | | 5/2009 | Morita et al. | | |
| 2010/0183814 | A1 | | 7/2010 | Rios et al. | | |
| 2010/0225010 | A1 | | 9/2010 | Katayama | | |
| 2011/0003906 | A1 | | 1/2011 | Angermaier et al. | | |
| 2012/0142803 | A1 | | 6/2012 | Inafuku et al. | | |
| 2012/0168780 | A1 | | 7/2012 | Cha et al. | | |
| 2013/0072592 | A1 | | 3/2013 | Inafuku et al. | | |

FOREIGN PATENT DOCUMENTS

| CN | 102585512 A | 7/2012 |
| CN | 102791800 A | 11/2012 |
| EP | 1731570 A1 | 12/2006 |
| JP | S60177029 A | 9/1985 |
| JP | S6195069 A | 5/1986 |
| JP | S61162561 A | 7/1986 |
| JP | H05239216 A | 9/1993 |
| JP | 2003213132 A | 7/2003 |
| JP | 2005194474 A | 7/2005 |
| JP | 2009220084 A | 10/2009 |
| JP | 2009270067 A | 11/2009 |
| JP | 2010047646 A | 3/2010 |

(Continued)

OTHER PUBLICATIONS

English translation of International Search Report for PCT/JP2018/040248 dated Feb. 5, 2018, 2 pages.

(Continued)

*Primary Examiner* — Kuo Liang Peng

(74) *Attorney, Agent, or Firm* — Warner Norcross + Judd LLP

(57) ABSTRACT

Provided is a cured product using a composition that is capable of quick curing at low temperatures while having sufficient pot life at room temperature, a method of producing the same, a laminate, and an optical device. A method of producing an organopolysiloxane cured product is provided. The method includes: (i) performing, without irradiating with high-energy radiation, a hydrosilylation reaction upon a composition containing a first hydrosilylation reaction catalyst that exhibits activity in the composition and a second hydrosilylation reaction catalyst that does not exhibit activity when not irradiated with high-energy radiation, but exhibits activity in the composition when irradiated with high-energy radiation, to obtain a thickened material that is fluid at room temperature or a thermoplastic material that is non-fluid at room temperature but exhibits fluidity at 100° C.; and (ii) irradiating the thickened material or thermoplastic material obtained in step (i) with high-energy radiation to obtain a cured product.

13 Claims, No Drawings

(56) References Cited

FOREIGN PATENT DOCUMENTS

| JP | 2010202801 A | | 9/2010 |
|----|--------------|---|--------|
| JP | 2011012264 A | | 1/2011 |
| JP | 2012121960 A | | 6/2012 |
| JP | 2013063391 A | | 4/2013 |
| JP | 2014082399 A | | 5/2014 |
| JP | 2015214637 A | | 12/2015 |
| WO | 2007047289 | * | 4/2007 |
| WO | 2007047289 A1 | | 4/2007 |
| WO | 2017079502 A1 | | 5/2017 |

OTHER PUBLICATIONS

Machine assisted English translation of JPS61162561A obtained from https://worldwideespacenet.com on Apr. 29, 2020, 11 pages.
Machine assisted English translation of JP2003213132A obtained from https://patents.google.com/patent on Apr. 29, 2020, 10 pages.
Machine assisted English translation of JP2009220084A obtained from https://patents.google.com/patent on Apr. 29, 2020, 11 pages.
Machine assisted English translation of JP2009270067A obtained from https://patents.google.com/patent on Apr. 29, 2020, 9 pages.
Machine assisted English translation of JP2010047646A obtained from https://patents.google.com/patent on Apr. 29, 2020, 10 pages.
Machine assisted English translation of JP2014082399A obtained from https://patents.google.com/patent on Apr. 29, 2020, 11 pages.
Machine assisted English translation of JP2015214637A obtained from https://patents.google.com/patent on Apr. 29, 2020, 14 pages.
Machine assisted English translation of JP2005194474A obtained from https://patents.google.com/patent on Jul. 12, 2022, 10 pages.

* cited by examiner

METHOD FOR PRODUCING ORGANOPOLYSILOXANE CURED PRODUCT, ORGANOPOLYSILOXANE CURED PRODUCT, LAYERED PRODUCT, AND OPTICAL PART

CROSS-REFERENCE TO RELATED APPLICATIONS

This application is the National Stage of International Appl. No. PCT/JP2018/040248 filed on 30 Oct. 2018, which claims priority to and all advantages of Japanese Appl. No. 2017-211400 filed on 31 Oct. 2017, the content of which is hereby incorporated by reference.

FIELD OF THE INVENTION

The present invention pertains to an organopolysiloxane cured product produced via a two-stage hydrosilylation reaction, a method of producing the same, a laminate in which this organopolysiloxane cured product is disposed between layers, a method of manufacturing the same, and an optical device using this cured product.

PRIOR ART

Silicone materials obtained from organopolysiloxanes are utilized in various applications for their superior heat resistance, chemical resistance, electrical insulation, and other properties. Silicone materials can be formed on a variety of substrates such as plastic, metal, glass, ceramic, paper, and wood, and have diverse applications, such as in everyday goods, medical supplies, and electronic products. In recent years, silicone materials have been widely used in transparent parts in laminates, such as image display devices, and optical devices, such as illumination devices, that require heat resistance and lightfastness. Ordinarily, silicone materials are obtained by cross-linking an organopolysiloxane via a hydrosilylation reaction. Ordinarily, a heat-activated transition metal complex catalyst is used in the hydrosilylation reaction for the sake of ease of operation, etc. To achieve curing in a short time, organopolysiloxanes must be heated to high temperatures. However, when a silicone material is formed on a substrate constituted by, for example, a thermoplastic resin film, a catalyst activated by irradiation with high-energy radiation, such as UV radiation, is used since the substrate cannot be heated to high temperatures (Patent Document 1).

However, organopolysiloxane compositions using high-energy-radiation-activated catalysts often do not cure immediately even when irradiated with high-energy radiation, and require heating to be cured in short periods of time, and increasing the amount of catalyst in order to cure the composition in a short time results in the problem of discoloration of the cured product. Curing at low temperatures with low amounts of catalyst leads to the problem of incomplete curing, resulting in a cured product of low mechanical strength.

Meanwhile, the amount of catalyst must be increased in order to completely cure in a short time at a low temperature using a heat-activated catalyst, leading not only to the problem of discoloration of the cured product, but also the problem wherein the material thickens extremely rapidly, thus reducing pot life at room temperature. Moreover, curing at low temperatures with low amounts of catalyst leads to the problem of incomplete curing, resulting in a cured product of low mechanical strength.

PRIOR ART LITERATURE

Patent Literature

[Patent Document 1] Japanese Patent Application Publication No. H05-239216

BRIEF SUMMARY OF THE INVENTION

Problem to be Solved by the Invention

Accordingly, an object of the present invention is to provide a cured product using a composition that is capable of quick curing at low temperatures while having sufficient pot life at room temperature, a method of producing the same, a laminate in which the cured product is disposed between layers, and an optical device in which the cured product is used as an optical member.

Means for Solving the Problem

The method of producing an organopolysiloxane cured product according to the present invention is a method including: (i) a step of performing, without irradiating with high-energy radiation, a hydrosilylation reaction upon a composition containing the components (A) through (D) described hereafter to obtain a thickened material that is fluid at room temperature or a thermoplastic material that is non-fluid at room temperature but exhibits fluidity at 100° C.; and (ii) a step of irradiating the thickened material or thermoplastic material obtained in step (i) with high-energy radiation; wherein components (A) through (D) are as follows.

(A) an organopolysiloxane represented by the following average composition formula (1):

$$R^1_a R^2_b SiO_{(4-a-b)/2} \quad (1);$$

(wherein $R^1$ is an alkenyl group comprising 2-12 carbon atoms; $R^2$ is a group selected from a monovalent hydrocarbon group comprising 1-12 carbon atoms and not comprising an aliphatic unsaturated bond, a hydroxyl group and an alkoxy group; and a and b are numbers satisfying the following conditions: $1 \leq a+b \leq 3$ and $0.001 \leq a/(a+b) \leq 0.33$);

(B) an organopolysiloxane represented by the following average composition formula (2):

$$H_c R^3_d SiO_{(4-c-d)/2} \quad (2)$$

(wherein $R^3$ is a group selected from a monovalent hydrocarbon group comprising 1-12 carbon atoms and not comprising an aliphatic unsaturated bond, a hydroxyl group, and an alkoxy group; and c and d are numbers satisfying the following conditions: $1 \leq c+d \leq 3$ and $0.01 \leq c/(c+d) \leq 0.33$);

(C) a first hydrosilylation reaction catalyst that exhibits activity in the composition without being irradiated with high-energy radiation; and (D) a second hydrosilylation reaction catalyst that does not exhibit activity when not irradiated with high-energy radiation, but exhibits activity in the composition when irradiated with high-energy radiation.

The high-energy radiation is preferably any of ultraviolet radiation, X-rays, or an electron beam. Component (B) is preferably an organohydrogen polysiloxane represented by the following average unit formula (3):

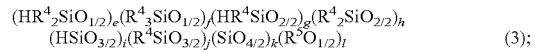

$$(HR^4_2SiO_{1/2})_e(R^4_3SiO_{1/2})_f(HR^4SiO_{2/2})_g(R^4_2SiO_{2/2})_h \\ (HSiO_{3/2})_i(R^4SiO_{3/2})_j(SiO_{4/2})_k(R^5O_{1/2})_l \quad (3);$$

(wherein each $R^4$ is, independently, a group selected from a monovalent hydrocarbon group comprising 1-12 carbon atoms and not comprising an aliphatic unsaturated bond, a hydroxyl group, and an alkoxy group; $R^5$ is a hydrogen atom or an alkyl group comprising 1-6 carbon atoms; and e, f, g, h, i, j, k, and l are numbers satisfying the following conditions: e+f+g+h+i+j+k=1, 0≤l≤0.1, 0.01≤e+g+i≤0.2, 0≤e≤0.6, 0≤g≤0.6, 0≤i≤0.4, 0.01≤e+f≤0.8, 0.01≤g+h≤0.8, 0≤i+j≤0.6). In addition, the molar ratio ((C)/(D)) of component (C) and component (D) is preferably 0.001-1000.

Another aspect of the present invention pertains to an organopolysiloxane cured product produced via the method described above.

Another aspect of the present invention is a laminate in which an organopolysiloxane cured product produced via the method described above is disposed between layers, the laminate preferably being an image display device.

Another aspect of the present invention pertains to an optical device comprising an organopolysiloxane cured product produced via the method described above.

Yet another aspect of the present invention is a method of manufacturing a laminate in which an organopolysiloxane cured product is disposed between layers, encompassing the following three methods. A first method comprises: (iii) a step of applying a composition containing components (A) through (D) to a substrate, and performing a hydrosilylation reaction thereupon without irradiating with high-energy radiation to form a layer of thickened material that is fluid at room temperature or a thermoplastic material that is non-fluid at room temperature but exhibits fluidity at 100° C.; (iv) a step of forming an upper layer member over the layer of thickened material or thermoplastic material obtained in step (iii); and (v) a step of irradiating the layer of thickened material or thermoplastic material with high-energy radiation from at least one of below the substrate, above the upper layer member, and the side of the layer of thickened material or thermoplastic material.

A second method of manufacturing a laminate in which an organopolysiloxane cured product is disposed between layers includes: (vi) a step of applying a composition containing components (A) through (D) to a substrate, and performing a hydrosilylation reaction thereupon without irradiating with high-energy radiation to form a layer of thickened material that is fluid at room temperature or thermoplastic material that is non-fluid at room temperature but exhibits fluidity at 100° C.; (vii) a step of irradiating the layer of thickened material or thermoplastic material obtained in step (vi) with high-energy radiation; (viii) a step of forming an upper layer member over the layer of thickened material or thermoplastic material having been irradiated with the high-energy radiation; and (ix) a step of heating or letting stand at room temperature to cure the layer of thickened material or thermoplastic material.

A third method of manufacturing a laminate in which an organopolysiloxane cured product is disposed between layers includes: (x) a step of applying a composition containing components (A) through (D) to a substrate, and performing a hydrosilylation reaction thereupon without irradiating with high-energy radiation to form a layer of thickened material that is fluid at room temperature or thermoplastic material that is non-fluid at room temperature but exhibits fluidity at 100° C.; (xi) a step of irradiating the layer of thickened material or thermoplastic material obtained in step (x) with high-energy radiation; (xii) a step of forming an upper layer member over the layer of thickened material or thermoplastic material having been irradiated with the high-energy radiation; and (xiii) a step of irradiating the layer of thickened material or thermoplastic material with high-energy radiation from at least one of below the substrate, above the upper layer member, and the side of the layer of thickened material or thermoplastic material.

Another aspect of the present invention pertains to a laminate obtained via any of the methods described above.

Yet another aspect of the present invention is a method of forming an optical device on a surface of which is formed an organopolysiloxane cured product, the method including: (ixv) a step of applying a composition containing components (A) through (D) to a release film, and performing a hydrosilylation reaction thereupon without irradiating with high-energy radiation to form a thermoplastic film that is non-fluid at room temperature but exhibits fluidity at 100° C.; (xv) a step of disposing the thermoplastic film on an optical device; and (xvi) irradiating the thermoplastic film obtained in step (xv), or a melt thereof, with high-energy radiation.

Yet another aspect of the present invention pertains to an optical device obtained via the method described above.

Effects of the Invention

In accordance with the method of producing an organopolysiloxane cured product according to the present invention, an organopolysiloxane composition containing two kinds of hydrosilylation catalyst, one that exhibits activity without being irradiated with high-energy radiation and one that is activated by high-energy radiation, is used, thus facilitating low-temperature curing. In addition, the laminate and optical device according to the present invention can be efficiently manufactured in a short time, and the obtained laminate and optical device are highly reliable.

BEST MODE FOR EMBODYING THE INVENTION (Composition)

The organopolysiloxane cured product used in the present invention is produced from a composition containing the following components (A) through (D). These will be stated in order below.

Component (A)

Component (A) is a compound containing an aliphatic unsaturated group to which a hydrosilyl group (—SiH) is added during the hydrosilylation reaction, and is an organopolysiloxane having the following average composition formula (1).

$$R^1_a R^2_b SiO_{(4-a-b)/2} \quad (1)$$

In general formula (1), $R^1$ is an alkenyl group comprising 2-12 carbon atoms. Specific examples include a vinyl group, an allyl group, a butenyl group, a pentenyl group, a hexenyl group, a heptenyl group, an octenyl group, a nonenyl group, a decenyl group, an undecenyl group, and a dodecenyl group, of which a vinyl group, allyl group, or hexenyl group is preferable. $R^2$ is a group selected from a monovalent hydrocarbon group comprising 1-12 carbon atoms and not comprising an aliphatic unsaturated bond, a hydroxyl group, and an alkoxy group. Part of the hydrogen atoms of the monovalent hydrocarbon group comprising 1-12 carbon atoms may be substituted with halogen atoms or hydroxyl groups. Examples of monovalent hydrocarbon groups comprising 1-12 carbon atoms include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, and pyrenyl groups; aralkyl groups such as benzyl groups, phenethyl groups, naphthylethyl groups, naphthylpropyl groups, anthracenylethyl groups, phenanthrylethyl groups, and pyrenylethyl groups; and groups obtained by substituting the hydrogen atoms in these aryl groups and aralkyl groups with an alkyl group such as a methyl group or ethyl group, an alkoxy group such as a methoxy group or ethoxy group, or a halogen atom such as a chlorine atom or a bromine atom.

a and b are numbers satisfying the conditions $1 \leq a+b \leq 3$ and $0.001 \leq a/(a+b) \leq 0.33$, and preferably numbers satisfying the conditions $1.5 \leq a+b \leq 2.5$ and $0.005 \leq a/(a+b) \leq 0.2$. This is because the cured product will have high flexibility if a+b is equal to or greater than the minimums of the abovementioned ranges, and the cured product will have high mechanical strength if a+b is equal to or less than the maximums of the abovementioned ranges, and because the mechanical strength of the cured product will increase if a/(a+b) is equal to or greater than the minimums of the abovementioned ranges, and the flexibility of the cured product will increase if a/(a+b) is equal to or less than the maximums of the abovementioned ranges.

Examples of the molecular structure of such an organopolysiloxane include straight-chain, branched-chain, and cyclic. The organopolysiloxane may be one type or a mixture of two or more types of compound having such a molecular structure.

Component (A) is preferably a straight-chain organopolysiloxane represented by the general formula $R^6_3SiO(R^6_2SiO)_tSiR^6_3$ and/or a branched-chain organopolysiloxane represented by the average unit formula $(R^6SiO_{3/2})_o(R^6_2SiO_{2/2})_p(R^6SiO_{1/2})_q(SiO_{4/2})_r(XO_{1/2})_s$. In the formula, each $R^6$ is an unsubstituted or halogen-substituted monovalent hydrocarbon group, examples of which include the same groups as mentioned above. X is a hydrogen atom or an alkyl group. At least two instances of $R^6$ per molecule are alkenyl groups. These alkenyl groups are preferably vinyl groups. In order to minimize the attenuation of light by the obtained cured product through refraction, reflection, scattering, and the like, at least 30 mol % of $R^6$ per molecule are aryl groups, preferably at least 40 mol %. These aryl groups are preferably phenyl groups. In the formula, t is an integer in a range of 5-1,000. In the formula, o is a positive number, p is 0 or a positive number, q is 0 or a positive number, r is 0 or a positive number, s is 0 or a positive number, and p/o is a number in a range of 0-10, q/o is a number in a range of 0-5, r/(o+p+q+r) is a number in a range of 0-0.3, and s/(o+p+q+r) is a number in a range of 0-0.4.

Meanwhile, component (A) may be (a1) a straight-chain or branched-chain organopolysiloxane comprising a terminal alkenyl group comprising 2-12 carbon atoms, (a2) an organopolysiloxane represented by the average unit formula $(R^5_3SiO_{1/2})_m(R^5_2SiO_{2/2})_n(R^5SiO_{3/2})_o(SiO_{4/2})_p$ (wherein $R^5$ is a monovalent hydrocarbon group comprising 1-12 carbon atoms; and m, n, and o are numbers satisfying the following conditions: m+n+o+p=1, $0.2 \leq m \leq 0.5$, $0 \leq n \leq 0.3$, $0 \leq o \leq 0.8$, $0 \leq p \leq 0.6$, and $0.2 \leq o+p \leq 0.8$) or a mixture of component (a1) and component (a2). In particular, such a mixture can be used along with component (B) to obtain a thermoplastic material that is heat-meltable.

Component (B)

Component (B) is a compound containing a hydrosilyl group (—SiH) that is added to the alkenyl group in component (A) during the hydrosilylation reaction, and is an organopolysiloxane having the following average composition formula (2).

$$H_cR^3_dSiO_{(4-c-d)/2} \qquad (2)$$

In general formula (2), $R^3$ is a group selected from a monovalent hydrocarbon group comprising 1-12 carbon atoms and not comprising an aliphatic unsaturated bond, a hydroxyl group, and an alkoxy group. Part of the hydrogen atoms of the monovalent hydrocarbon group comprising 1-12 carbon atoms may be substituted with halogen atoms or hydroxyl groups. Examples of monovalent hydrocarbon groups comprising 1-12 carbon atoms include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, and pyrenyl groups; aralkyl groups such as benzyl groups, phenethyl groups, naphthylethyl groups, naphthylpropyl groups, anthracenylethyl groups, phenanthrylethyl groups, and pyrenylethyl groups; and groups obtained by substituting the hydrogen atoms in these aryl groups and aralkyl groups with an alkyl group such as a methyl group or ethyl group, an alkoxy group such as a methoxy group or ethoxy group, or a halogen atom such as a chlorine atom or a bromine atom. Examples of alkoxy groups include methoxy groups, ethoxy groups, propoxy groups, butoxy groups, pentanoxy groups, hexanoxy groups, and octanoxy groups.

c and d are numbers satisfying the conditions $1 \leq c+d \leq 3$ and $0.01 \leq c/(c+d) \leq 0.33$, and preferably numbers satisfying the conditions $1.5 \leq c+d \leq 2.5$ and $0.05 \leq c/(c+d) \leq 0.2$. This is because the cured product will have high flexibility if c+d is equal to or greater than the minimums of the abovementioned ranges, and the cured product will have high mechanical strength if c+d is equal to or less than the maximums of the abovementioned ranges, and because the mechanical strength of the cured product will increase if c/(c+d) is equal to or greater than the minimums of the abovementioned ranges, and the flexibility of the cured product will increase if c/(c+d) is equal to or less than the maximums of the abovementioned ranges.

While there is no particular limitation upon the viscosity of the organopolysiloxane having average composition formula (2) set forth above, the viscosity thereof at 25° C. is preferably in a range of 0.5-10,000 mPa·s, especially preferably in a range of 1-1,000 mPa·s.

Examples of organopolysiloxanes having average composition formula (2) include 1,1,3,3-tetramethyldisiloxane; 1,3,5,7-tetramethylcyclotetrasiloxane; tris(dimethylhydrogensiloxy)methylsilane; tris(dimethylhydrogensiloxy)phenylsilane; methyl hydrogen polysiloxane capped at both ends with trimethylsiloxy groups; a dimethylsiloxane-methyl hydrogen siloxane copolymer capped at both ends with trimethylsiloxy groups; dimethylpolysiloxane capped at both ends with dimethylhydrogensiloxy groups; a dimethylsiloxane-methyl hydrogen siloxane copolymer capped at both ends with dimethylhydrogensiloxy groups; a methyl hydrogen siloxane-diphenylsiloxane copolymer capped at both ends with trimethylsiloxy groups; a methyl hydrogen siloxane-diphenylsiloxane-dimethylsiloxane copolymer capped at both ends with trimethylsiloxy groups; condensed trimethoxysilane hydrolyzate; a copolymer comprising a $(CH_3)_2HSiO_{1/2}$ unit and a $SiO_{4/2}$ unit; a copolymer comprising a $(CH_3)_2HSiO_{1/2}$ unit, a $SiO_{4/2}$ unit, and a $(C_6H_5)SiO_{3/2}$ unit; and mixtures of two or more of these.

Further examples of organopolysiloxanes having average composition formula (2) include the following organopolysiloxanes. In the formulas, Me and Ph respectively represent methyl groups and phenyl groups; m1 is an integer from 1 to 100; n1 is an integer from 1 to 50; and b1, c1, d1, and e1 are each positive numbers, wherein the total of b1, c1, d1, and e1 per molecule is 1.

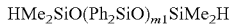

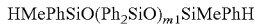

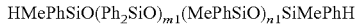

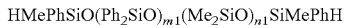

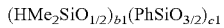

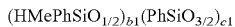

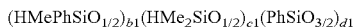

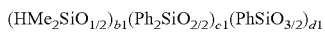

Component (B) is also preferably an organohydrogen polysiloxane represented by the following average unit formula (3).

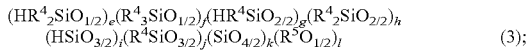

In general formula (3), each $R^4$ is, independently, a group selected from a monovalent hydrocarbon group comprising 1-12 carbon atoms and not comprising an aliphatic unsaturated bond, a hydroxyl group, and an alkoxy group. The same considerations as discussed above apply to the monovalent hydrocarbon group comprising 1-12 carbon atoms, the hydroxyl group, and the alkoxy group. $R^5$ is a hydrogen atom or an alkyl group comprising 1-6 carbon atoms, with examples of alkyl groups comprising 1-6 carbon atoms including methyl groups, ethyl groups, propyl groups, butyl groups, and hexyl groups. e, f, g, h, i, j, k, and l are numbers satisfying the following conditions: $e+f+g+h+i+j+k=1$, $0 \leq l \leq 0.1$, $0.01 \leq e+g+i \leq 0.2$, $0 \leq e \leq 0.6$, $0 \leq g \leq 0.6$, $0 \leq i \leq 0.4$, $0.01 \leq e+f \leq 0.8$, $0.01 \leq g+h \leq 0.8$, and $0 \leq i+j \leq 0.6$.

The aforementioned "$HR^4_2SiO_{1/2}$," "$R^4_3SiO_{1/2}$," "$HR^4SiO_{2/2}$," "$R^42SiO_{2/2}$," "$HSiO_{3/2}$," "$R^4SiO_{3/2}$," and "$SiO_{4/2}$" constituent units are organohydrogen polysiloxane partial structure units respectively referred to as the $M^H$ unit, the M unit, the $D^H$ unit, the D unit, the $T^H$ unit, the T unit, and the Q unit; and "$R^5O_{1/2}$" is a group that bonds to the oxygen atoms in the D unit, $D^H$ unit, T unit, $T^H$ unit, and Q unit, and refers to a hydroxyl group bonded to a silicon atom (Si—OH) in the organohydrogen polysiloxane, or to a residual alkoxy group bonded to a silicon atom that was not reacted during the production of the organopolysiloxane. The $M^H$ unit is mainly present on the ends of the molecular chain of an organohydrogen polysiloxane, and the $D^H$ unit is present within the molecular chain of an organohydrogen polysiloxane.

The component (B) content is an amount such that the amount of hydrogen atoms bonds to silicon atoms in the component is in a range of 0.1-5 mol, preferably 0.5-2 mol, per total 1 mol of alkenyl groups in component (A). This is because the cured product will have greater mechanical strength if the component (B) content is equal to or greater than the minimum of the abovementioned range, and the cured product will have greater flexibility if the component (B) content is equal to or less than the maximum of the abovementioned range.

In the present invention, it is especially preferable that the mixture of component (A) and component (B) be a thermoplastic material that is heat-meltable. Using these components makes it possible to impart heat-meltability to the composition as a whole. It is especially preferable for the sake of heat-meltability that component (A) be a mixture of components (a1) and (a2) described above.

Specifically, the composition used in the production method of the present invention may be a heat-meltable thermoplastic material, and can be non-fluid at 25° C. and have a viscosity of 1,000 Pas or less, preferably 500 Pas or less, at 100° C. As used herein, the term "non-fluid" means that the material does not flow in an unloaded state, and indicates, for example, a state in which the material is below the softening point as measured according to the ring-and-ball softening point test method for hot melt adhesives defined in JIS K 6863-1994 "Softening point test methods for hot melt adhesives." In other words, to be non-fluid at 25° C., the softening point must be higher than 25° C. This is because shape retention at 25° C. will be good if the material is non-fluid at that temperature. In addition, having the 100° C. melt viscosity be in the abovementioned range makes it easier to work the material into various shapes, and enables the material to exhibit satisfactory conformity to raised and recessed parts on a member when in a molten state, thus yielding superior gap fill properties. This property is primarily determined by the composition as a whole, especially the selection and amounts of the components of the composition, and, in particular, is realized by the amount of organopolysiloxane resin constituting component (a2) in component (A), and the selection of component (B), though the present invention is not limited to this being the case.

Component (C)

Component (C) is a first hydrosilylation catalyst that exhibits activity in the composition without being irradiated with high-energy radiation. Component (C) is a hydrosilylation reaction catalyst for partially curing the composition; examples include platinum catalysts, rhodium catalysts, palladium catalysts, nickel catalysts, iridium catalysts, ruthenium catalysts, and iron catalysts, with a platinum catalyst being preferable. Examples of platinum catalysts include platinum micropowder, platinum black, platinum-supported silica micropowder, platinum-supported activated charcoal, and platinum compounds such as hexachloroplatinic acid, an alcohol solution of hexachloroplatinic acid, a platinum-olefin complex, and a platinum-alkenylsiloxane complex, with a platinum-alkenylsiloxane complex being especially preferable. Examples of alkenylsiloxanes include 1,3-divinyl-1,1,3,3-tetramethyldisiloxane; 1,3,5,7-tetramethyl-1,3,5,7-tetravinylcyclotetrasiloxane; alkenylsiloxanes wherein some of the methyl groups of these alkenylsiloxanes are substituted with ethyl groups, phenyl groups, or the like; and alkenylsiloxanes wherein the vinyl groups of these alkenylsiloxanes are substituted with allyl groups, hexenyl groups, or the like. In particular, because this platinum-alkenylsiloxane complex has good stability, 1,3-divinyl-1,1,3,3-tetramethyldisiloxane is preferable. It is also preferable to add an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinylcyclotetrasiloxane, or an organosiloxane oligomer such as a dimethylsiloxane oligomer, with an alkenylsiloxane being especially preferable, to the complex, as this will make it possible to improve the stability of the platinum-alkenylsiloxane complex.

The catalyst of component (C) is a catalyst that exhibits activity without being irradiated with high-energy radiation, preferably one that exhibits activity even at comparatively low temperatures. Specifically, the catalyst exhibits activity in the composition, thus promoting the hydrosilylation reaction, in a temperature range of 0-200° C. The component (C) content varies according to the type of catalyst and the type of composition, but normally is an amount such that the amount of metal atoms in the catalyst with respect to the composition is in a range of 0.01-50 ppm, preferably 0.1-30 ppm, by mass.

Component (D)

Component (D) is a second hydrosilylation catalyst that does not exhibit activity when not irradiated with high-energy radiation, but exhibits activity in the composition when irradiated with high-energy radiation. Component (D) is what is referred to as a high-energy-radiation-activated catalyst or a photoactivated catalyst, and is known in the art in this field.

As used herein, the term high-energy radiation refers to ultraviolet radiation, gamma rays, X-rays, alpha rays, electron beams, and the like, with ultraviolet radiation, X-rays, and electron beams emitted by commercially available electron beam irradiators being preferable. For industrial purposes, ultraviolet radiation in a wavelength range of 280-380 nm can easily be used. While the irradiation dose will vary according to the type of high-energy-radiation-activated catalyst, if ultraviolet radiation is used, the cumulative dose at wavelength 365 nm is preferably in a range of 100 mJ/cm$^2$ to 10 J/cm$^2$.

Specific examples of component (D) include (methylcyclopentadienyl)trimethylplatinum(IV), (cyclopentadienyl)trimethylplatinum(IV), (1,2,3,4,5-pentamethylcyclopentadienyl)trimethylplatinum(IV), (cyclopentadienyl)dimethylethylplatinum(IV), (cyclopentadienyl)dimethylacetylplatinum(IV), (trimethylsilylcyclopentadienyl)trimethylplatinum(IV), (methoxycarbonylcyclopentadienyl)trimethylplatinum(IV), (dimethylphenylsilylcyclopentadienyl)trimethylcyclopentadienylplatinum(IV), trimethyl(acetylacetonato)platinum (IV), trimethyl(3,5-heptanedionato)platinum(IV), trimethyl (methylacetoacetato)platinum(IV), bis(2,4-pentanedionato) platinum(II), bis(2,4-hexanedionato)platinum(II), bis(2,4-heptanedionato)platinum(II), bis(3,5-heptanedionato)platinum(II), bis(1-phenyl-1,3-butanedionato)platinum(II), bis(1,3-diphenyl-1,3-propanedionato)platinum(II), and bis (hexafluoroacetylacetonato)platinum(II); of these, (methylcyclopentadienyl)trimethylplatinum(IV) and bis(2,4-pentanedionato)platinum(II) are preferable for their versatility and ease of acquisition.

The component (D) content is the amount necessary to further cure the composition after the latter has been partially cured by component (C), and is preferably an amount such that the amount of metal atoms in the catalyst with respect to the composition is in a range of 1-50 ppm, preferably 5-30 ppm, by mass.

The molar ratio ((C)/(D)) of component (C) and component (D) is ordinarily 0.001-1000, preferably 0.01-100. This is because the curing reaction effected by irradiation with high-energy radiation can be accelerated if the molar ratio is equal to or less than the aforementioned maximum, and the curing reaction can be performed in a short time at a low temperature if the molar ratio is equal to or greater than the aforementioned minimum.

The organopolysiloxane composition used in the present invention preferably does not contain a hydrosilylation reaction inhibitor. Ordinarily, hydrosilylation reaction inhibitors are added to compositions in order to improve the pot life of the composition and obtain a stable composition. However, a stable composition can be obtained without adding a hydrosilylation reaction inhibitor in the present invention, and it is preferable that the curing reaction not be retarded by the addition of a hydrosilylation reaction inhibitor.

Component (E)

As necessary, other organopolysiloxanes; adhesiveness-imparting-agents; inorganic fillers such as silica, glass, alumina, and zinc oxide; organic resin micropowders such as polymethacrylate resin; and phosphors, heat-proofing agents, dyes, pigments, flame retardants, solvents, and the like can be added to the organopolysiloxane composition used in the present invention. The added amounts and methods of addition will be known to a person skilled in the art.

The composition used in the present invention can be prepared by homogeneously mixing components (A) through (D), and other optional components as necessary. The composition can be prepared at room temperature using various types of stirring devices or mixers, or optionally by mixing in a heated state, as necessary. There is also no limitation upon the order in which the various components are added, and the components can be mixed in any order.

The composition used in the present invention may be prepared, for example, by adding and mixing in component (D) while heating and mixing components (A) through (C) in a temperature range of 80° C. to 120° C. In this temperature range, the composition as a whole will soften, making it possible to uniformly disperse component (D) throughout the whole, which, in particular, yields the advantage that curing defects when molding into a sheet or the like, and partial cohesive failure during bonding, can be avoided. Meanwhile, softening will be insufficient if the temperature is less than the aforementioned minimum, potentially impeding the uniform dispersion of component (D) throughout the whole, even using mechanical force. Conversely, a temperature exceeding the aforementioned maximum is not preferable, as component (D) may react during mixing, causing the whole to exhibit pronounced thickening or curing. There is no limitation upon the mixer used in the production method of the present invention; examples include single- and twin-screw continuous mixers, twin rollers, Ross mixers, Hobart mixers, dental mixers, planetary mixers, kneader mixers, Labo Milsers, compact mills, and Henschel mixers, with a Labo Milser, compact mill, or Henschel mixer being preferable.

If the mixture of component (A) and component (B) is a heat-meltable thermoplastic material, it is possible, when producing the composition used in the present invention, to add component (D) to a melt of the thermoplastic material constituted by component (A), preferably component (A) including components (a1) and (a2), and component (B) at an overall temperature in a range of 60° C. to 140° C., preferably 80° C. to 120° C., and uniformly disperse the component therein, followed by cooling. The mixer used for this dispersion process is the same as the aforementioned mixers.

(Method of Producing Cured Product)

The method of producing an organopolysiloxane cured product according to the present invention comprises the following steps:

(i) a step of performing a first hydrosilylation reaction upon a composition containing components (A) through (D) without irradiating with high-energy radiation to obtain a thickened material or a thermoplastic material; and
(ii) irradiating the obtained semi-cured product with high-energy radiation and performing a second hydrosilylation reaction thereupon to obtain an organopolysiloxane cured product.

(Step (i))

Step (i) is a step of performing a first hydrosilylation reaction upon the composition without irradiating with high-energy radiation to obtain a thickened material that is fluid at room temperature, or a thermoplastic material that is non-fluid at room temperature but exhibits fluidity at 100° C. While heating is not particularly necessary in this step, the composition may be heated to a temperature less than 100° C., preferably less than 60° C., to accelerate the first hydrosilylation reaction. Heating time will vary according to the types and amounts of the various components in the composition but is ordinarily 5 minutes to 2 hours, preferably 10 minutes to 1 hour.

Step (i) yields a thickened material that is fluid at room temperature, or a thermoplastic material that is not fluid at room temperature but exhibits fluidity at 100° C. As used herein, the term thickened material refers to a material having a viscosity at 25° C. that is 1.5 times to 100 times the initial viscosity of the composition. Thermoplastic material refers to a material having a viscosity of 1,000,000 mPa·s or less at 100° C.

(Step (ii))

Step (ii) is a step of irradiating the thickened material or thermoplastic material with high-energy radiation. The irradiation with high-energy radiation activates the catalyst, and the activated catalyst starts the hydrosilylation reaction. There are cases in which catalyst activation and the hydrosilylation reaction occur simultaneously during the irradiation with high-energy radiation, and cases in which catalyst activation primarily occurs during the irradiation with high-energy radiation, with the greater part of the hydrosilylation reaction occurring during heating or at room temperature following the irradiation with high-energy radiation. The type of high-energy radiation is as discussed above. While the irradiation dose will vary according to the type of high-energy-radiation-activated catalyst, if ultraviolet radiation is used, the cumulative dose at 365 nm is preferably in a range of 100 mJ/cm$^2$ to 10 J/cm$^2$.

This includes cases in which the thickened material or thermoplastic material is converted to the cured product by the hydrosilylation reaction, and cases in which the thickened material or thermoplastic material is uncured at this time, but converted to the cured product in a subsequent step (heating, etc.), as described hereafter.

Step (ii) or the subsequent step converts the composition, which was previously a thickened material or thermoplastic material, to a cured product, enabling usage thereof as various types of materials. As used herein, the term cured product refers to a product that is not fluid even when heated to 200° C. or higher. While there is no particular limitation upon the hardness of the cured product, the product will normally be a gel having a probe depth of 70 or less to a hard resin having a Shore D hardness of 80. An example of a subsequent step is a heating step. If a heating step is present after step (ii), the heating can be performed at 0-200° C., preferably 20-100° C., for 5-360 minutes, preferably 10-120 minutes.

The cured product formed by the method according to the present invention has superior optical transparency. Specifically, the product has a transmittance of 90% or more at 450 nm, and a haze value, which is a measure of clouding, of 1 or less. The cured product of the present invention is advantageous as a transparent member disposed between layers in a laminate such as an image display device, or as a transparent member for an optical device.

(Laminate)

The cured product of the present invention is advantageous as a transparent member disposed between layers in a laminate such as an image display device. Examples of such image display devices include liquid crystal image display devices, touch panel liquid crystal image display elements, organic EL image display elements, touch panel organic EL image display elements, microLED image display devices, touch panel microLED image display devices, and reflective image display devices. These all have laminated structures comprising various stacked layers; the cured product of the present invention has a function of inhibiting the reflection of light at the interfaces of these layers when disposed therebetween.

For example, the cured product of the present invention exhibits little discoloration or clouding in high-temperature or high-temperature, high-humidity environments, and thus is an advantageous material for forming an intermediate layer between the image-displaying part and the protective part of an image display device. Examples of substrates for such image-displaying parts and protective parts include inorganic optical materials such as glass and ITO, and organic optical materials such as polycarbonate resin, acrylic resin, epoxy resin, and polystyrene resin. A transparent electrode may optionally be formed on the surface of this optical member.

One method of forming the cured product is, for example, to apply the composition to a substrate in the form of a film, tape, or sheet, followed by irradiating with high-energy radiation and leaving to stand at room temperature or heating at a low temperature to cause a hydrosilylation reaction and advance curing. Alternatively the composition may be disposed between two substrates and cured to strongly bond the substrates, or applied in a smooth coating to at least one surface of the substrates and immobilized through partial curing, followed by putting the two substrates together and further curing to form a strong bond. While there is no limitation upon the thickness of the cured product, 1-100,000 μm is preferable, and 50-30,000 μm more preferable.

The composition of the present invention cures at comparatively low temperatures, and thus can also be used as a coating for substrates having poor heat resistance. Typical such substrates include transparent substrates such as glass, synthetic resin films and sheets, and transparent electrode films. Example of the method by which the composition of the present invention is applied include dispensing, gravure coating, microgravure coating, slit coating, slot coating, screen printing, stencil printing, and comma coating.

(Laminate Formation Method)

A first method for forming the laminate according to the present invention comprises the following steps:
(iii) a step of applying the composition containing components (A) through (D) to a substrate without irradiating the composition with high-energy radiation to form a layer of thickened material or thermoplastic material from the composition;
(iv) a step of forming an upper layer member over the layer of thickened material or thermoplastic material; and
(v) a step of irradiating with high-energy radiation from above the upper layer member formed in step (iv).

(Step iii)

In step (iii), the same process as in step (i) of the cured product production method described above is performed on a laminate substrate under the same conditions; however, the obtained product is preferably a thickened material so that the following step of forming the upper layer member (bonding step) can be performed at a low temperature.

(Step iv)

Step (iv) is a step of bonding a layer disposed above; while various methods are possible, it is preferable, for the sake of avoiding the entrainment of bubbles, to bond the laminate in a vacuum, or to include a process of pressurizing the laminate in an autoclave following bonding to remove any microscopic bubbles.

(Step v)

Step (v) is a step of irradiating with high-energy radiation from above the upper layer member formed in step (iv) to obtain a cured product. Specifically, it is a step of irradiating with high-energy radiation through the transparent section formed on the substrate to cause a curing reaction starting from the point of irradiation and obtain a cured product, with the same step as in step (ii) of the cured product production method described above being performed with the cured product sandwiched between the two layers above and below, and under the same conditions; however, because the irradiation with high-energy radiation is performed through a layer, a higher dose is preferable.

A second method for forming the laminate according to the present invention comprises the following steps:

(vi) a step of applying the composition containing components (A) through (D) to a substrate without irradiating the composition with high-energy radiation to form a thickened material or thermoplastic material from the composition;

(vii) a step of irradiating with high-energy radiation;

(viii) a step of forming an upper layer member over the thickened material or thermoplastic material; and (ix) a step of curing the thickened material or thermoplastic material through heating or at room temperature.

(Step vi)

Step (vi) is identical to step (iii) in the cured product production method described above.

(Step vii)

Step (vii) is similar to step (v) of the cured product production method described above; however, it is preferable, in this step, that the composition not be converted to a cured product, but retain the form of a thickened material or a thermoplastic material, especially preferably a thickened material, so that the following bonding step can be efficiently performed. Therefore, it is preferable to adjust the high-energy radiation dose as appropriate.

(Step viii)

Step (viii) is identical to step (iv) in the cured product production method described above.

(Step ix)

As the high-energy-radiation-activated catalyst has already been activated in step (vii), the reaction can proceed at room temperature in step (ix) to yield a cured product; however, it is preferable to heat the composition in order to further accelerate the process.

A third method for forming the laminate layer according to the present invention comprises the following steps:

(x) a step of applying the composition containing components (A) through (D) to a substrate without irradiating the composition with high-energy radiation to form a layer of thickened material or thermoplastic material from the composition;

(xi) a step of irradiating the layer of thickened material or thermoplastic material obtained in step (x) with high-energy radiation;

(xii) a step of forming an upper layer member over the layer of thickened material or thermoplastic material; and (xiii) a step of irradiating with high-energy radiation from above the upper layer member formed in step (xii).

(Step x)

Step (x) is identical to step (vi) in the cured product production method described above.

(Step xi)

Step (xi) is identical to step (vii) in the cured product production method described above; however, it is preferable to adjust the high-energy radiation dose in order to heighten the curing through irradiation with high-energy radiation in step (xii).

(Step xii)

Step (xii) is identical to step (viii) in the cured product production method described above.

(Step xiii)

Step (xii) is a step of activating the high-energy-radiation-activated catalyst, which was inactive in step (x), to advance the hydrosilylation reaction and obtain a cured product.

(Optical Device)

The cured product of the present invention is advantageous as an optical member for an optical device; examples of such optical devices include light-receiving display device such as liquid crystal displays (LCDs) and electrochromic displays (ECDs); light-emitting display devices such as LED devices and electroluminescent displays (ELDs); and various other types of illumination devices, for which the cured product of the present invention can be used as a sealant for light-emitting elements, or as an optical member such as a lens material. The cured product of the curable silicone composition according to the present invention can be used to bond a liquid crystal, organic EL, or other type of display part and a display-forming member such as a touch panel or cover lens, or to bond display-forming members, thereby improving the visibility of the optical display.

(Optical Device Manufacturing Method)

A method for forming an optical device according to the present invention comprises the following steps.

Step (ixv)

Step (ixv) is a step of forming a thermoplastic transparent film on a release film under the same conditions used to obtain the thermoplastic material in step (i) described above; specifically, a smooth coating of the composition is applied to a release film partially hydrosilylated to obtain a stable thermoplastic transparent film. While there is no limitation upon the thickness of the film, a thickness in a range of 0.1 mm to 5 mm will be practical.

Step (xv)

Step (xv) is a step of cutting the obtained thermoplastic transparent film to a suitable size, peeling the film from the release film, placing the film on an optical device such as a light-emitting element, and heating to melt the thermoplastic transparent film and seal the light-emitting element.

Step (xvi)

Step (xvi), like step (ii) described above, is a step of effecting a hydrosilylation reaction starting from the locations irradiated with high-energy radiation to obtain a cured product.

EXAMPLES

Cured products were obtained from compositions containing the components described below. In the various average composition formulas, Me, Ph, and Vi respectively represent a methyl group, a phenyl group, and a vinyl group.

Example 1

A composition containing 3.5 parts by weight of a vinyl-terminated branched-chain polysiloxane (A-1) represented by the average unit formula $(Me_2ViSiO_{1/2})_{0.044}(Me_3SiO_{1/2})_{0.411}(SiO_{4/2})_{0.545}$, 89.7 parts by weight of a vinyl-terminated straight-chain polysiloxane (A-2) represented by the average unit formula $ViMe_2SiO(SiMe_2O)_{322}SiMe_2Vi$, 6.8 parts by weight of a straight-chain polysiloxane (B-1) represented by the average unit formula $HMe_2SiO(SiMe_2O)_{10}SiMe_2H$, 5 ppm platinum atoms in the form of a platinum-1,3-divinyl-1,1,3,3-tetramethyldisiloxane complex (C-1), and 20 ppm platinum atoms in the form of (methylcyclopentadienyl)trimethylplatinum(IV) (D-1) was prepared. The viscosity of the composition was 1,800 mPa·s. Following preparation, the composition was left standing for 10 minutes, then thickened to a viscosity of 3,200 mPa·s, and irradiated with a 2 W high-pressure mercury-vapor lamp equipped with an ozone-cutting filter so that the dose of 365 nm ultraviolet radiation was 5,000 mJ/cm$^2$. Measurement immediately following irradiation showed that the composition had increased to a viscosity of 30,000 mPa·s or higher while retaining fluidity; however, it was confirmed that the composition gelled and become non-fluid five minutes after UV irradiation. Measurement of the cured product with a hardness probe at 10-minute intervals showed that the cured product stabilized at a constant probe depth of 32 1 hour after UV irradiation, confirming that the curing reaction was complete.

Example 2

A composition containing 3.5 parts by weight of A-1, 6.5 parts by weight of A-2, 82.4 parts by weight of a vinyl-terminated straight-chain polysiloxane (A-3) represented by the average composition formula $ViMe_2SiO(SiMe_2O)_{535}SiMe_2Vi$, 4.6 parts by weight of B-1, 10 ppm platinum atoms in the form of C-1, and 20 ppm platinum in the form of D-1 was prepared. The viscosity of the composition was 8,200 mPa·s. Following preparation, the composition was left standing for 10 minutes, then thickened to a viscosity of 14,000 mPa·s, and irradiated with a 2 W high-pressure mercury-vapor lamp with an ozone-cutting filter so that the dose of 365 nm ultraviolet radiation was 2,500 mJ/cm$^2$. Measurement immediately following irradiation showed that the composition had increased to a viscosity of 50,000 mPa·s or higher while retaining fluidity; however, it was confirmed that the composition gelled and become non-fluid 10 minutes after UV irradiation. Measurement of the cured product with a hardness probe at 10-minute intervals showed that the cured product stabilized at a constant probe depth of 35 1 hour after UV irradiation, confirming that the curing reaction was complete.

Example 3

A composition containing 55.7 parts by weight of a vinyl-terminated branched-chain polysiloxane (A-4) represented by the average unit formula $(Me_2ViSiO_{1/2})_{0.1}(Me_3SiO_{1/2})_{0.4}(SiO_{4/2})_{0.5}$, 13.3 parts by weight of a branched-chain polysiloxane (E-1) represented by the average unit formula $(Me_3SiO_{1/2})_{0.44}(SiO_{4/2})_{0.56}$, 1.7 parts by weight of a vinyl-terminated straight-chain polysiloxane (A-3) represented by the average unit formula $ViMe_2SiO(SiMe_2O)_{160}SiMe_2Vi$, 24.6 parts by weight of a straight-chain polysiloxane (B-2) represented by the average unit formula $HMe_2SiO(SiMe_2O)_{400}SiMe_2H$, 4.7 parts by weight of a straight-chain polysiloxane (B-3) represented by the average unit formula $Me_3SiO(SiMe_2O)_{30}(SiMeHO)_{30}SiMe_3$, 0.2 ppm platinum atoms in the form of C-1, and 5 ppm platinum atoms in the form of D-1 was prepared. The viscosity of the composition was 3,500 mPa·s. The composition was heated to 90° C. for 30 minutes to obtain a thermoplastic material that was non-fluid at 25° C. but fluid at 100° C. The obtained thermoplastic material did not lose fluidity at 100° C. even after being stored at 25° C. for two months. The thermoplastic material was irradiated with a 2,500 mJ/cm$^2$ dose of 365 nm ultraviolet radiation using a 2 W high-pressure mercury-vapor lamp equipped with an ozone-cutting filter, then heated to 120° C. for 30 minutes to obtain a cured product having a Shore D hardness of 80.

Example 4

A composition containing 32.2 parts by weight of A-4, 28.5 parts by weight of E-1, 20.7 parts by weight of A-3, 15.7 parts by weight of B-2, 2.9 parts by weight of B-3, 0.1 ppm platinum atoms in the form of C-1, and 5 ppm platinum atoms in the form of D-1 was prepared. The viscosity of the composition was 2,800 mPa·s. The composition was heated to 90° C. for 30 minutes to obtain a thermoplastic material that was non-fluid at 25° C. but fluid at 100° C. The obtained thermoplastic material did not lose fluidity at 100° C. even after being stored at 25° C. for two months. The thermoplastic material was irradiated with a 2,500 mJ/cm$^2$ dose of 365 nm ultraviolet radiation using a 2 W high-pressure mercury-vapor lamp equipped with an ozone-cutting filter, then heated to 120° C. for 30 minutes to obtain a cured product having a Shore D hardness of 35.

Example 5

Using a bar coater, the composition of example 1 was applied to a thickness of 200 μm on a member formed by joining a liquid crystal panel and a polarizer plate. Following application, irradiation with a 5,000 mJ/cm$^2$ dose of 365 nm ultraviolet radiation was performed within 5 minutes using a conveyor-type UV irradiation apparatus. A cover glass was placed thereover within 3 minutes following irradiation, and left standing at room temperature. At first, the cover glass moved when force was applied in the lateral direction; however, it began to resist movement 5 minutes after UV irradiation, and ceased to move altogether after 30 minutes.

Example 6

A composition containing 93.6 weight % of a vinyl-terminated straight-chain polysiloxane (A-5) represented by the average composition formula $ViMe_2SiO(SiMePhO)_{36}SiMe_2Vi$, 1.0 weight % of a vinyl-group-comprising polysiloxane (A-6) represented by the average composition formula $(ViMe_2SiO_{1/2})0.22(MeXSiO_{2/2})0.12(PhSiO_{3/2})0.66$ (wherein X represents a glycidoxypropyl group), 3.9 weight % of a straight-chain polysiloxane (B-3) represented by the molecular formula $Ph_2Si(OSiMe_2H)_2$, 1.3 weight % of a branched polysiloxane (B-4) represented by the average composition formula $(HMe_2SiO_{1/2})_{0.6}(PhSiO_{3/2})_{0.4}$, 0.2 weight % glycidoxypropyltrimethoxysilane, 5 ppm platinum atoms in the form of C-1, and 20 ppm platinum atoms in the form of D-1 was prepared. The viscosity of the composition was 6,000 mPa·s. When left standing at 25° C. for 10 minutes, the composition yielded a thickened material having a viscosity of about 12,000 mPa·s. The thermoplastic material was irradiated with a 2,500 mJ/cm² dose of ultraviolet radiation using a 2 W high-pressure mercury-vapor lamp equipped with an ozone-cutting filter. Following UV irradiation, the composition had transformed into a fluid gel after 15 minutes at 25° C., and a cured product having a probe depth of 35 was obtained after 40 minutes at 25° C.

Comparative Example 1

A composition containing 3.5 parts by weight of A-1, 89.7 parts by weight of A-2, 6.8 parts by weight of B-1, and 60 ppm platinum atoms in the form of C-1 was prepared. The viscosity of the composition was 1,800 mPa·s. The composition began generating heat immediately after being prepared, and gelled and became non-fluid after 1 minute. As curing had progressed too rapidly, it was impossible to prepare a sample for probe depth measurement, and the cured product exhibited reddish-brown discoloration.

Comparative Example 2

A composition containing 3.5 parts by weight of A-1, 89.7 parts by weight of A-2, 6.8 parts by weight of B-1, and 20 ppm platinum atoms in the form of D-1 was prepared. The viscosity of the composition was 1,800 mPa·s. After being prepared, the composition was left standing for 10 minutes to reach a constant viscosity of 1,800 mPa·s, then irradiated with a 5,000 mJ/cm² dose of 365 nm ultraviolet radiation using a 2 W high-pressure mercury-vapor lamp equipped with an ozone-cutting filter; measurement immediately following irradiation showed that viscosity had increased to 3,200 mPa·s. As the composition did not gel even after 1 hour post-irradiation, the composition was heated to 100° C., whereupon it was confirmed that the composition had finally become non-fluid after 30 minutes.

Comparative Example 3

A composition containing 55.7 parts by weight of A-4, 13.3 parts by weight of E-1, 1.7 parts by weight of A-3, 24.6 parts by weight of B-2, 4.7 parts by weight of B-, and 2 ppm platinum atoms in the form of C-1 was prepared. The viscosity of the composition was 3,500 mPa·s. The composition was heated to 90° C. for 30 minutes to obtain a cured product having a Shore A hardness of 80. When the composition was heated to 50° C. for 30 minutes to obtain a softer composition, a cured product having a Shore A hardness of 40 was obtained. However, the obtained cured product did not exhibit fluidity at high temperatures, and gradually hardened over time, reaching a Shore A hardness of 75 after 2 weeks at 25° C.

Comparative Example 4

A composition containing 32.2 parts by weight of A-4, 28.5 parts by weight of E-1, 20.7 parts by weight of A-3, 15.7 parts by weight of B-2, 2.9 parts by weight of B-3, 0.1 ppm platinum atoms in the form of C-1, and 5 ppm platinum atoms in the form of D-1 was prepared. The viscosity of the composition was 2,800 mPa·s. The composition was heated to 90° C. for 30 minutes, but no change whatsoever was observed in the composition.

Comparative Example 5

A composition containing 94.0 parts by weight of A-2, 4.1 parts by weight of B-2, 1.4 parts by weight of B-3, and 5 ppm platinum atoms in the form of C-1 was prepared. The viscosity of the composition was 2,100 mPa·s. The composition gelled after 30 minutes at 25° C.

Comparative Example 6

Using a bar coater, the composition of comparative example 2 was applied to a thickness of 200 μm on a member formed by joining a liquid crystal panel and a polarizer plate. Following application, irradiation with a 5,000 mJ/cm² dose of 365 nm ultraviolet radiation was performed within 5 minutes using a conveyor-type UV irradiation apparatus. A cover glass was placed thereover within 3 minutes following irradiation, and left standing at room temperature. Liquid gradually seeped from the edges of the cover glass, and the composition did not cure even after 30 minutes following UV irradiation.

Comparative Example 7

A composition containing 93.6 weight % of A-5, 1.0 weight % of A-6, 3.9 weight % of B-3, 1.3 weight % of B-4, 0.2 weight % of glycidoxypropyltrimethoxysilane, and 5 ppm platinum atoms in the form of C-1 was prepared. The viscosity of the composition was 6,000 mPa·s. When left standing at 25° C. for 10 minutes, the composition yielded a thickened material having a viscosity of about 12,000 mPa·s. The thermoplastic material was irradiated with a 2,500 mJ/cm² dose of 365 nm ultraviolet radiation using a 2 W high-pressure mercury-vapor lamp equipped with an ozone-cutting filter. The composition gradually became fluid and had changed to a gel after 60 minutes at 25° C. following UV irradiation, but the probe depth continued to deepen even after 2 hours at 25° C., revealing that the curing reaction was not complete.

INDUSTRIAL APPLICABILITY

The method of producing an organopolysiloxane cured product according to the present invention yields a product that is capable of rapidly curing at low temperature while having sufficient pot life at room temperature, and thus is advantageous as a method for forming an inter-layer laminate of an image display device.

The invention claimed is:
1. A laminate wherein an organopolysiloxane cured product is disposed between layers, and wherein the organopolysiloxane cured product is produced via a method including:
  (i) performing, without irradiating with high-energy radiation, a hydrosilylation reaction upon a composition comprising:
    (A) an organopolysiloxane represented by the following average composition formula (1):

$$R^1_a R^2_b SiO_{(4-a-b)/2} \qquad (1);$$

wherein $R^1$ is an alkenyl group comprising 2-12 carbon atoms; $R^2$ is a group selected from a monovalent hydrocarbon group comprising 1-12 carbon atoms and not comprising an aliphatic unsaturated bond, a hydroxyl group and an alkoxy group; and a and b are numbers satisfying the following conditions: $1 \leq a+b \leq 3$ and $0.001 \leq a/(a+b) \leq 0.33$;

(B) an organopolysiloxane represented by the following average composition formula (2):

$$H_c R^3_d SiO_{(4-c-d)/2} \quad (2);$$

wherein $R^3$ is a group selected from a monovalent hydrocarbon group comprising 1-12 carbon atoms and not comprising an aliphatic unsaturated bond, a hydroxyl group, and an alkoxy group; and c and d are numbers satisfying the following conditions: $1 \leq c+d \leq 3$ and $0.01 \leq c/(c+d) \leq 0.33$;

(C) a first hydrosilylation reaction catalyst that exhibits activity in the composition without being irradiated with high-energy radiation; and (D) a second hydrosilylation reaction catalyst that does not exhibit activity when not irradiated with high-energy radiation, but exhibits activity in the composition when irradiated with high-energy radiation;

to obtain a thickened material that is fluid at room temperature, or a thermoplastic material that is non-fluid at room temperature but exhibits fluidity at 100° C.; and (ii) irradiating the thickened material or thermoplastic material obtained in step (i) with high-energy radiation.

2. The laminate according to claim 1, wherein the high-energy radiation is selected from the group consisting of ultraviolet radiation, gamma radiation, X-ray radiation, alpha radiation, and electron beam radiation.

3. The laminate according to claim 1, wherein component (B) is an organohydrogen polysiloxane represented by the following average unit formula (3):

$$(HR^4_2SiO_{1/2})_e(R^4_3SiO_{1/2})_f(HR^4SiO_{2/2})_g(R^4_2SiO_{2/2})_h (HSiO_{3/2})_i(R^4SiO_{3/2})_j(SiO_{4/2})_k(R^5O_{1/2})_l \quad (3);$$

wherein each $R^4$ is, independently, a group selected from a monovalent hydrocarbon group comprising 1-12 carbon atoms and not comprising an aliphatic unsaturated bond, a hydroxyl group, and an alkoxy group; $R^5$ is a hydrogen atom or an alkyl group comprising 1-6 carbon atoms; and e, f, g, h, i, j, k, and l are numbers satisfying the following conditions: $e+f+g+h+i+j+k=1$, $0 \leq l \leq 0.1$, $0.01 \leq e+g+i \leq 0.2$, $0 \leq e \leq 0.6$, $0 \leq g \leq 0.6$, $0 \leq i \leq 0.4$, $0.01 \leq e+f \leq 0.8$, $0.01 \leq g+h \leq 0.8$, $0 \leq i+j \leq 0.6$.

4. The laminate according to claim 1, wherein the molar ratio ((C)/(D)) of component (C) and component (D) is 0.001-1000.

5. The laminate according to claim 1, wherein the product is an image display device.

6. An optical device comprising the laminate according to claim 1.

7. A method of manufacturing a laminate in which an organopolysiloxane cured product is disposed between layers, the method including providing a composition comprising:

(A) an organopolysiloxane represented by the following average composition formula (1):

$$R^1_a R^2_b SiO_{(4-a-b)/2} \quad (1);$$

wherein $R^1$ is an alkenyl group comprising 2-12 carbon atoms; $R^2$ is a group selected from a monovalent hydrocarbon group comprising 1-12 carbon atoms and not comprising an aliphatic unsaturated bond, a hydroxyl group and an alkoxy group; and a and b are numbers satisfying the following conditions: $1 \leq a+b \leq 3$ and $0.001 \leq a/(a+b) \leq 0.33$;

(B) an organopolysiloxane represented by the following average composition formula (2):

$$H_c R^3_d SiO_{(4-c-d)/2} \quad (2);$$

wherein $R^3$ is a group selected from a monovalent hydrocarbon group comprising 1-12 carbon atoms and not comprising an aliphatic unsaturated bond, a hydroxyl group, and an alkoxy group; and c and d are numbers satisfying the following conditions: $1 \leq c+d \leq 3$ and $0.01 \leq c/(c+d) \leq 0.33$;

(C) a first hydrosilylation reaction catalyst that exhibits activity in the composition without being irradiated with high-energy radiation; and (D) a second hydrosilylation reaction catalyst that does not exhibit activity when not irradiated with high-energy radiation, but exhibits activity in the composition when irradiated with high-energy radiation.

8. The method of manufacturing a laminate according to claim 7, the method including:

(iii) applying the composition comprising components (A) through (D) to a substrate, and performing a hydrosilylation reaction without irradiating with high-energy radiation to form a layer of a thickened material that is fluid at room temperature, or a thermoplastic material that is non-fluid at room temperature but exhibits fluidity at 100° C.;

(iv) forming an upper layer member over the layer of thickened material or thermoplastic material obtained in step (iii); and (v) irradiating the layer of thickened material or thermoplastic material with high-energy radiation from at least one of below the substrate, above the upper layer member, and the side of the layer of thickened material or thermoplastic material.

9. A laminate obtained via the method according to claim 8.

10. The method of manufacturing a laminate according to claim 7, the method including:

(vi) applying the composition comprising components (A) through (D) to a substrate, and performing a hydrosilylation reaction without irradiating with high-energy radiation to form a layer of a thickened material that is fluid at room temperature, or a thermoplastic material that is non-fluid at room temperature but exhibits fluidity at 100° C.;

(vii) irradiating the layer of thickened material or thermoplastic material obtained in step (vi) with high-energy radiation;

(viii) forming an upper layer member over the layer of thickened material or thermoplastic material following irradiation with the high-energy radiation; and (ix) curing the layer of thickened material or thermoplastic material by heating or letting stand at room temperature.

11. A laminate obtained via the method according to claim 10.

12. The method of manufacturing a laminate according to claim 7, the method including:

(x) applying the composition comprising components (A) through (D) to a substrate, and performing a hydrosilylation reaction without irradiating with high-energy radiation to form a layer of a thickened material that is fluid at room temperature, or a thermoplastic material that is non-fluid at room temperature but exhibits fluidity at 100° C.;

(xi) irradiating the layer of thickened material or thermoplastic material obtained in step (x) with high-energy radiation;
(xii) forming an upper layer member over the layer of thickened material or thermoplastic material following irradiation with the high-energy radiation; and
(xiii) irradiating the layer of thickened material or thermoplastic material with high-energy radiation from at least one of below the substrate, above the upper layer member, and the side of the layer of thickened material or thermoplastic material.

13. A laminate obtained via the method according to claim 12.

\* \* \* \* \*